United States Patent Office 3,534,886
Patented Oct. 20, 1970

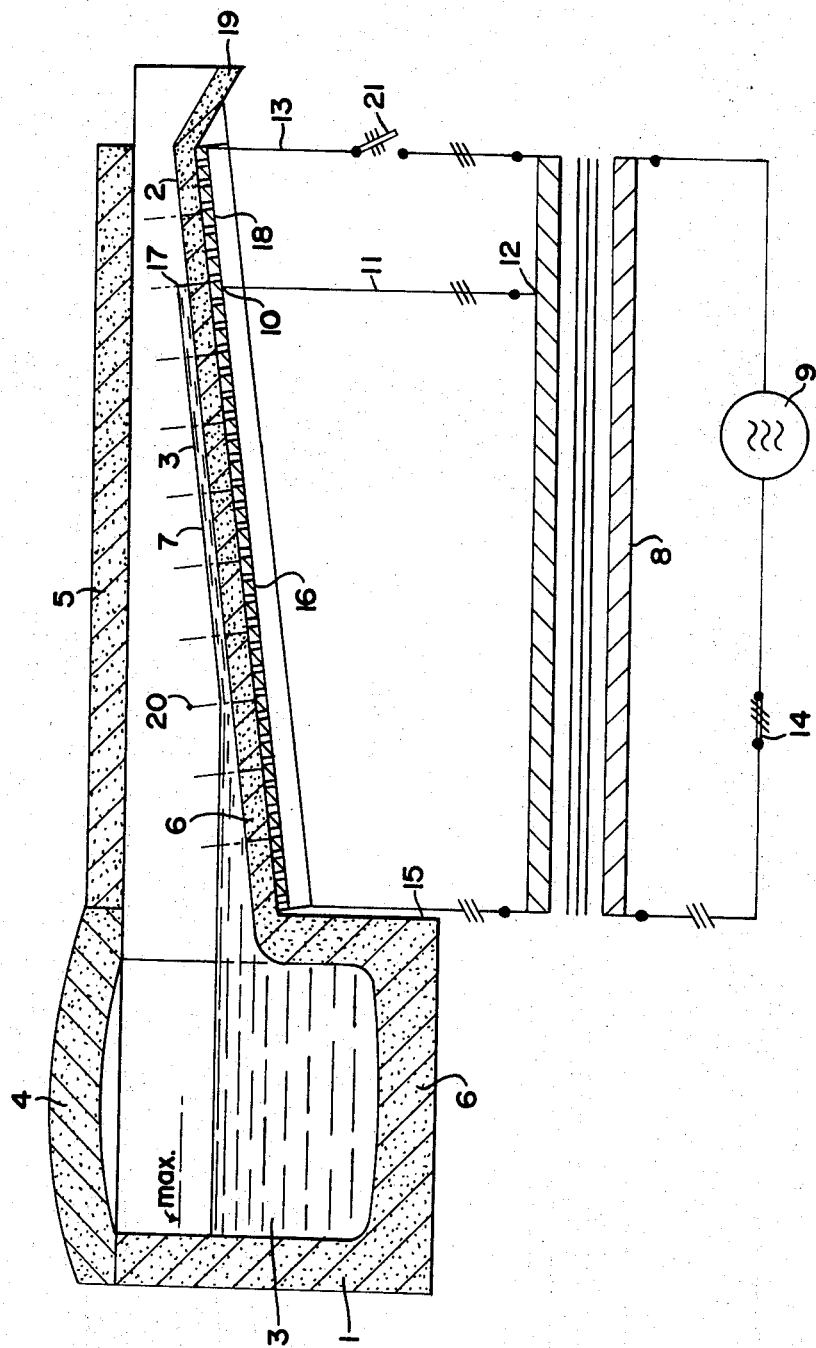

3,534,886
METHOD AND APPARATUS FOR METERING LIQUID METALS TO BE CONVEYED ELECTROMAGNETICALLY FROM MELTING CRUCIBLES OR HEAT-RETAINING VESSELS
Axel von Starck, Remscheid-Luttringhausen, Germany, assignor to AEG-Elotherm G.m.b.H., Remscheid-Hasten, Germany
Filed June 12, 1968, Ser. No. 736,419
Claims priority, application Germany, Sept. 7, 1967, A 56,715
Int. Cl. B67d 5/02
U.S. Cl. 222—1                                            11 Claims

ABSTRACT OF THE DISCLOSURE

Molten metal is conveyed from the vessel in which it is contained to a delivery spout by subjecting it to the influence of a straight line translational magnetic field produced by a straight line polyphase alternating-current electric winding. In order that the rate of delivery of the metal can be controlled by controlling the duration of the time that it is subjected to the magnetic field, an inclined trough or channel is used. It is arranged to have the magnetic field applied to the major portion of the channel with the upper end portion separately controlled so that when the upper end portion is not energized, the molten metal travels upward along the inclined channel to the portion which is not energized. Whenever a quantity of metal is to be delivered, the remaining portion of the channel is energized. This is of fixed length. Consequently, regardless of the height of the level of liquid in the vessel from which the metal is conveyed, a fixed weight of metal will be delivered in a fixed duration of time.

---

It is well known that liquid metals with a high melting point, such as copper, nickel, iron and aluminum can be transported by means of an induction pump. For this purpose electromagnetic forces and pressures are used. The induction pump consists of an inductor which is developed from a normal induction motor. The stator consists of a polyphase winding, normally a three-phase winding, which is positioned in the slots of a laminated core and is connected to a polyphase, sine-wave voltage source. The purpose of the core is to guide the magnetic flux, which is generated by the winding. It is laminated to avoid losses by eddy currents.

It is well known, also, that a three phase winding is constructed in such a way that it generates two different alternating-current, sine-wave fields in quadrature, or displaced 90° in space and time phase. By superimposing these two alternating-current fields, a locally distributed magnetic sine wave field is formed, which circulates around the circumference. This is normally called a rotating field. The characteristic dimension of the winding is its pole span. This is measured as an arc of the circumference of the stator and represents one-half the wavelength of the rotating sine wave in the magnetic field.

The circumference of the stator of an induction motor divided by the pole span results in an even number. If the stator were to be cut along its longitudinal axis, at the margin of one polar division or pole span, and then unrolled together with its winding on to a plane, one would have the inductor of an induction pump. If the corresponding parts of the unrolled winding are connected, the the inductor winding is fed with a main power supply, then an electromagnetic field is generated in the inductor or armature or stator. This field takes the form of a locally distributed sine wave. This sine wave moves from one end of the inductor or stator to the other, following the sequence of the phases. The field produced is called an electromagnetic translational field, as opposed to an electromagnetic rotating field. The linearly positioned stator is also called an open stator. A special peculiarity of the inductor or stator is that its length, divided by the pole span may also be an uneven number. Furthermore, the magnetic field generated by the stator is irregular at either end in the area of the end pole spans.

If a conductive material such as fluid metal is brought into the translational magnetic field, induction currents will be generated in the metal. These currents together with the inducing magnetic field, in the same way as with induction motors, cause forces to be exerted in the moving direction of the translational field, corresponding to the "three finger rule."

This principle is utilized for the delivery of fluid metals, whereby the metal moves in a conveyor channel, which is attached to a furnace, which may be a melting furnace or a vessel for holding the molten metal at heat. The conveyor channel is provided with a fireproof lining. The conveyor channel is located in the field of influence of a linear stator in such a way, that tis longitudinal axis lies parallel to the direction of movement of the induced translational field.

It is well known that the weight of metal delivered in a given time by an electromagnetic conveyor channel depends only upon the voltage which is supplied to the inductor. The quantity of metal is not dependent upon the height of the level of the bath in the vessel from which the molten metal is delivered. Use of this principle is made for metering precisely the delivery of the quantity of metal. In accordance with the invention, an inclined, metal-delivering, electromagnetic conveyor channel is connected to a holding or melting vessel so that aprecise metal quantity per unit time is delivered. During delivery the inductor of the conveyor channel is maintained at a constant voltage. The fluid metal flows at a constant speed along the conveyor channel and it pours out at the end into an available container such as a mold. The metal quantity delivered from the conveyor channel into the container is directly proportional to the pouring time.

After the termination of the metering process, the inductor of the conveyor channel is switched off or its polarity is reversed. The metal then present in the conveyor channel moves back into the holding or melting vessel by its own gravity or by its own gravity supplemented by electromagnetic forces.

In the simple method of metering thus far described, the transit time of the metal front wave in the conveyor channel depends upon the height of the bath level in the holding or melting vessel, that is upon the point from which the molten metal must be carried. For this reason the length of time that the inductor needs to be energized depends upon the level of the bath of molten metal in the simple arrangement thus far described. In such an arrangement the length of time of energization of the inductor must be varied according to the height of the liquid metal in the vessel.

It is accordingly an object of the invention to render the length of operating time for the metering process independent of the changing level in the holding or melting vessel in order that the same quantity of fluid metal is always delivered in a predetermined metering time. In accordance with the invention, this is achieved by transporting the fluid metal in the electromagnetic conveyor channel to a point above the highest bath level inside the holding or melting vessel. From this point the metering process begins and the fluid metal is transported in certain limits of time, whereby the quantity of liquid metal delivered per unit of time is constant.

A better understanding of the invention will be afforded by the following detailed description considered in conjunction with the accompanying drawing which shows a vertical section of a furnace and a schematically represented molten metal metering apparatus.

As shown in the drawing, a holding or melting vessel 1 is provided with an upwardly inclined electromagnetic conveyor channel 2. The vessel 1 contains a body of molten metal 3 shown as having a level somewhat higher than the lower end of the chanel 2 although the vessel 1 is capable of holding sufficient metal to bring the liquid level up to a higher point such as represented by the maximum level line max. Covers 4 and 5 are provided for the vessel 1 and the conveyor channel 2, respectively, to prevent radiation losses.

Moreover, the vessel 1 and the conveyor channel 2 are lined with a fireproof heat insulating material. An inductor 7, shown schematically, is mounted directly under the conveyor channel 2. The necessary voltage to produce movement of the fluid metal is provided by a generator to which it is connected through a transformer 8, also shown schematically for simplicity, although the transformer and generator are actually three-phase devices. The inductor 7 comprises a three-phase winding which has a plurality of polar divisions or pole spans. For example, there may be eleven pole spans 20 as shown. The portion of the inductor winding at the upper end of the ninth pole span has a tap 10 connected thereto at a point above the highest or maximum bath level and the tap 10 is connected by means of a three-phase cable, shown schematically, to a connecting tap 12 of the transformer 8. In consequence, the main protion of the inductor winding between the lower end adjacent the vessel 6 and the tap 10 is energized with polyphase current when the three-phase main switch 14 of the generator 9 is closed.

In order to carry out the metering function, the remaining portion 18 of the inductor winding is adapted to be connected to the transformer 8 through another three-phase cable 13 by means of a three-phase on-off switch 21. It will be understood that in actual practice, in a three-phase winding, connections from the source of energy are made every 120 electrical degrees of spacing of the winding; but for simplicity, the three-phase cable 13 is represented as being connected merely at the end Likewise, in practice, there would be additional connections from the three-phase cables 11 and 15.

The metering of the molten metal takes place as follows. Normally the portion of the channel 2 between the lower end and the point 17, which is above the maximum bath level, is energized with an electromagnetic field so that the liquid metal 3 rises to point 17 only. At point 17 there is a buildup of metal, and a certain quantity of the liquid metal is held at this point. From this point on, it will be observed that the remainder of the channel 2 is of a fixed length regardless of the level of the bath 3; then when a quantity of metal is to be delivered from the spout 19 into a suitable container or mold (not shown), the portion 18 of the winding is energized so that the metal has only a fixed distance to travel and a fixed quantity of metal will be delivered from the spout 19 within a given time. The quantity to be delivered is then controlled by controlling the length of time that the three-phase switch 21 is closed, which thus serves for metering the metal.

After the switch 14 is closed, the part of the inductor 16 which is tapped between the cable connections 15 and 11 receives voltage from the generator 9 through the transformer 8 so that the fluid metal 3 which has hitherto been stationary in the conveyor channel 2 is then set in motion and transported up to the tap position 10 of the inductor 7, which is the starting point 17 of the metering process for the liquid metal 3 in the conveyor channel 2. The liquid metal 3 remains at the starting point 17 as long as the inductor part 16 is energized.

If a certain quantity of liquid metal 3 is to be delivered, the switch 21 is closed, whereby the upper portion 18 of the inductor is energized. The liquid metal 3, which is stationary at the starting point 17, then begins to flow up to the end of the conveyor channel 2 and pours over the nozzle 19 into a collecting vessel. Since the liquid metal 3 always traverses the same distance from the starting point 17 up to the end of the conveyor channel 2, the result is that the same quantity of liquid metal 3 is delivered from the conveyor channel 2 in the same time of pouring. By the continuous delivery of the liquid metal 3 by the voltage applied to the portion 16 of the inductor up to the starting point 17, which is always above the highest bath level, the metering process of the liquid metal can be practiced independently of the height of the bath level in the holding or melting vessel 1 and continues until the fluid metal remaining in the vessel is poured out. After the end of the metering process, the switch 21 is opened, whereby the portion 18 of the inductor becomes energized. In consequence, metal 3 in the channel 2 flows back and rests at the starting point 17 from which the next metering operation begins.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. The method of metering liquid metal from a vessel containing a mass of the metal which comprises the steps of
   (a) holding a quantity of the liquid metal at a point outside the vessel, and
   (b) causing the liquid metal to travel upwardly to said point from the vessel in a continuous stream and thence upwardly from the said point for a fixed period of time at a constant rate of flow measured in weight per unit time, discharging the liquid metal with continuous motion of all the liquid while discharging, whereby a predetermined weight of metal is delivered.

2. The method of delivering fixed weights of metal as described in claim 1 which comprises the steps of lifting liquid metal by electromagnetic induction to a point at a predetermined level and selectively thereafter lifting the metal from said point along a path of fixed length for a predetermined length of time at a constant rate of flow measured in weight per unit time.

3. The method of metering liquid metal from a vessel containing a mass of the metal and delivering fixed weights of metal which comprises the steps of
   (a) holding a quantity of the liquid metal at a point outside the vessel above the level of liquid in the vessel,
   (b) causing the liquid metal to travel upwardly to said point from the vessel and thence along an upwardly inclined path of fixed length from the said point for a fixed period of time at a constant rate of flow measured in weight per unit time, said travel being caused by
   (c) subjecting the metal to a magnetic field transverse to the desired path of the metal for lifting liquid metal inductively to said point outside the vessel and selectively thereafter lifting the metal from said point along a path of fixed length for a pre-determined length of time at a constant rate of flow measured in weight per unit time, whereby a predetermined weight of metal is delivered.

4. The method described in claim 3 wherein the metal is delivered along an inclined path from the vessel to the elevated point along a path in alignment with the aforesaid path of fixed length from the elevated point along a path in alignment with the aforesaid path of fixed length from the elevated level.

5. The method described in claim 4 wherein a translational polyphase magnetic field is employed for inductively lifting the liquid metal along the inclined path.

6. Apparatus suitable for metering liquid metal which comprises in combination with a vessel adapted to hold varying quantities of liquid metal up to a maximum liquid level.

(a) A channel inclined upwardly, extending from the side of the vessel for receiving liquid metal therefrom the channnel having a main portion extending from the vessel to a predetermined point above the maximum liquid level and a continution portion of fixed length beyind the said predetermined point, (b) Means for subjecting liquid metal in the main portion of the channel to a translational polyphase magnetic field traveling away from the vessel, (c) Means for selectively subjecting the fixed length continuation portion of the channel to a polyphase magnetic field for delivering molten metal from said predetermined point along said fixed length continuation portion of channel.

7. Apparatus as described in claim 6 wherein the means for generating the translational magnetic field comprises a polyphase winding having a plurality of pole spans extending linearly along the channel and mounted in inductive relation to liquid metal in the channel with means for separately energizing the portion of the winding along the main portion of the channel and the portion along the continuation of the channel.

8. Apparatus as described in claim 7 wherein the winding along the main portion of the channel is provided with electrical connections for applying a polyphase alternating current of fixed electromotive force thereto and means are provided for selectively connecting polyphase alternating current of fixed electromotive force to the remaining portion of the winding for delivering metal from said predetermined point of the main channel along the continuation of the channel.

9. Apparatus as described in claim 7 wherein the winding along the main portion of the channel is provided with electrical connections for applying a polyphase alternating current thereto and means are provided for selectively connecting polyphase alternating current to the remaining portion of the winding for delivering metal from said predetermined point of the main channel along the continuation of the channel.

10. Apparatus as described in claim 6 in which the polyphase magnetic field is of fixed magnetomotive force.

11. Apparatus as described in claim 10 wherein the means for generating the translational magnetic field comprises a polyphase winding having a plurality of pole spans extending linearly along the channel and mounted in inductive relation to liquid metal in the channel with means for separately energizing the portion of the winding along the main portion if the channel and the portion along the continuation of the channel.

References Cited

UNITED STATES PATENTS

| 2,707,718 | 5/1955 | Tama. | |
| 2,728,123 | 12/1955 | Jordan | 222—56 |
| 3,208,637 | 9/1965 | Heick | 222—70 X |
| 3,288,069 | 11/1966 | Michaux. | |
| 3,399,808 | 9/1968 | Bucy | 222—70 |

SAMUEL F. COLEMAN, Primary Examiner

H. S. LANE, Assistant Examiner

U.S. Cl. X.R.

13—33; 103—1; 222—70, 76, 383

UNITED STATES PATENT OFFICE
CERTIFICATE OF CORRECTION

Patent No. 3534886           Dated October 20, 1970

Inventor(s) Axel von Starck

It is certified that error appears in the above-identified patent and that said Letters Patent are hereby corrected as shown below:

Column 1, line 69, cancel the first word "the" and substitute -- and --.

Column 2, line 23, correct the spelling of the word "tis" to read "its".

Column 5, line 12, correct the spelling of the word "channnel" to read "channel".

Column 6, line 20, cancel the word "if" and substitute -- of --.

SIGNED AND
SEALED
JAN 5 1971

(SEAL)
Attest:

Edward M. Fletcher, Jr.        WILLIAM E. SCHUYLER, JR.
Attesting Officer               Commissioner of Patents